May 7, 1929.   V. G. BROCHON   1,711,988
COMBINED FOOT BRAKE PEDAL AND ACCELERATOR
Filed March 3, 1927    2 Sheets-Sheet 1

Inventor
Valentine G. Brochon
By his Attorney
Clarence G. Campbell

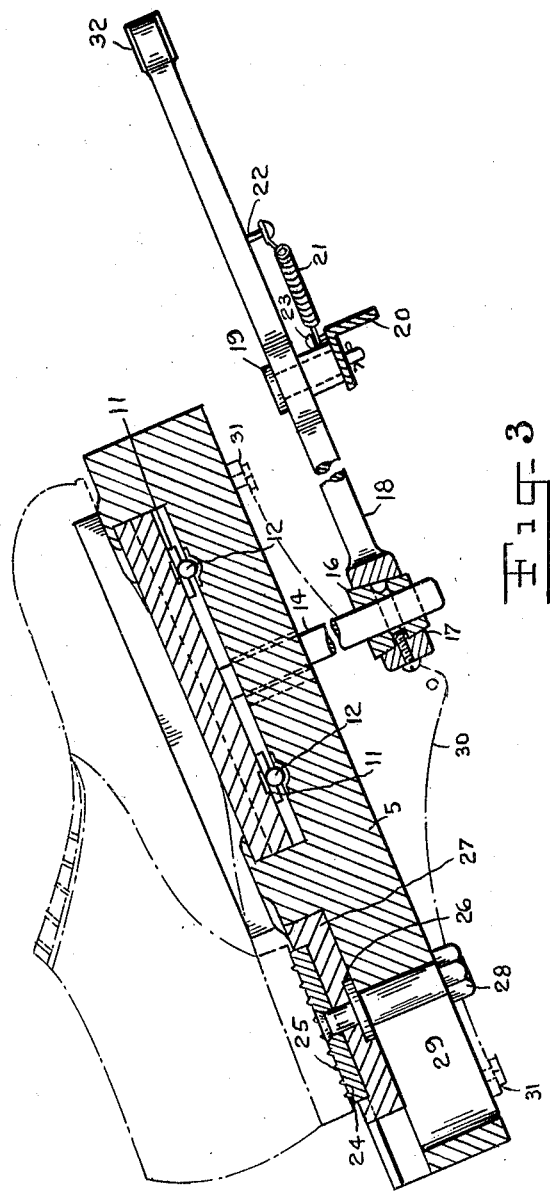

Patented May 7, 1929.

1,711,988

UNITED STATES PATENT OFFICE.

VALENTINE G. BROCHON, OF WOODHAVEN, NEW YORK.

COMBINED FOOT BRAKE PEDAL AND ACCELERATOR.

Application filed March 3, 1927. Serial No. 172,300.

This invention relates to an improvement in a combined foot brake pedal and accelerator and the novelty resides in the adaptation and arrangement of parts as will be more fully hereinafter pointed out.

There are many forms of foot brake pedals and also many forms of accelerator pedals but these have always been kept separate, both in the patent art as well as in the actual practice in connection with power driven vehicles.

The very rapid increase in traffic congestion on the streets as the result of the tremendous increase in the number of automobiles, particularly in the United States, has made it increasingly necessary to have adequate means for instantly stopping an automobile even though it may be going at a fairly high rate of speed, such for example as thirty-five miles an hour.

My device is adapted to meet the requirements fully, furnishing in combination in a foot brake pedal an accelerator control so that the operator may use his left foot for operating the clutch pedal in the usual manner and his right foot may always be kept upon this foot brake pedal and accelerator control, whereby he may simultaneously with his right foot release the brake and throw on the power and also simultaneously throw on the brake and throw off the power. Many serious accidents have occurred through the necessity of the present practice in automotive control of requiring the sliding of the right foot from the separate control pedal over to the foot brake pedal.

My device is actually fool proof in that it furnishes means whereby when the operator of a car becomes startled through some emergency occurring immediately in front of him thereby straightening out his legs quickly as he throws himself back, he will through the left foot push out the clutch and through the right foot push on the one-foot pedal, where he constantly keeps his foot, and will both throw on the brake and throw off the accelerator.

Referring to the drawings, Figure 1 is a top plan view of my device showing the surrounding and connecting portions being broken away for convenience in illustration.

Figure 3 is a vertical section on the line 3—3 in Figure 1.

Figure 1:
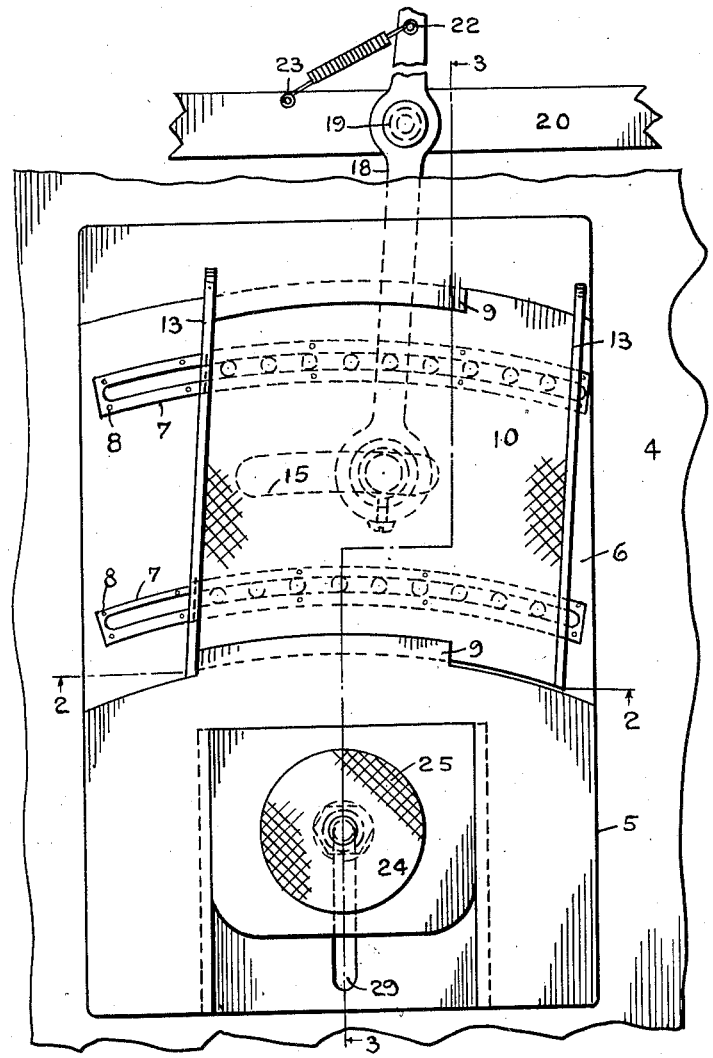
Figure 2:
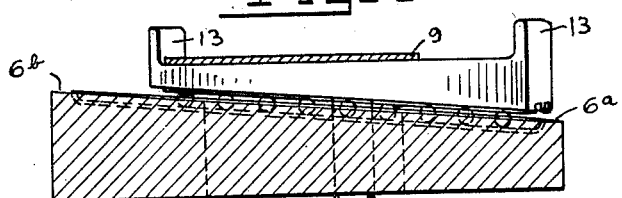
Figure 2 is a cross sectional view on the line 2—2 of Figure 1.

In the drawings 4 is the usual foot board of an automobile on which is mounted in the usual manner a foot brake pedal 5 which has a cut out bed 6 which is beveled with the decline going to the right as the operator faces the front of the car so that said bed 6 is lowest at $6^a$ and highest at $6^b$, on which bed 6 are mounted parallel arcuate slot plates 7 being rigidly secured in the usual way thereto at 8. The upper faces of the pedal 5 have projections 9 which project over the bed 6 so as to serve as retaining members for a sliding foot plate 10 which is adapted to be mounted on said bed 6 and which has a roughened non-slipping surface $10^a$ and rigidly mounted on its under side a pair of parallel arcuate slot plates 11 in perfect alignment with arcuate plates 7 of the bed 6 so that ball bearings 12 mounted in said plates 7 and 11 will function perfectly as ball bearings for the foot plate 10 so that it slides back and forth on said bed 6 freely and easily being limited only by the upturned edges 13 of said foot plate 10 which contact with the ends of the projections 9 thereby limiting the length of movement of said foot plate 10.

It is most important and should be noted at this point that because of the bevel of the bed 6 downwardly to the right as indicated by the difference in the height between $6^b$ and $6^a$ the foot plate 10 being thus mounted on ball bearings 12 will move so easily that it will always return to its normal position at the right as shown in Figure 1 without any foot pressure and will so return to the position at the right more quickly in case of any foot pressure of the operator.

A rod 14 rigidly secured to the base of the foot plate 10 and adapted to travel through an arcuate slot 15 in the pedal 5 projects at its lower end through a swivel bearing 16 which is pivoted at 17 in a lever arm 18 which lever arm is pivoted at 19 in the usual manner so that it will rotate freely thereon on a portion of the frame 20 of the automobile and a spring 21 is secured at 22 to the lever arm 18 and at 23 to the frame 20 thereby insuring the return of said lever arm 18 to its normal position and to the rod 14 carrying with it the foot plate 10 whereby it is always restored to its normal position as shown in Figure 1.

A heel plate 24 having a non-slipping roughened surface portion 25 is mounted on a pin 26 so that it will rotate freely thereon and a supporting or bed plate 27 is rigidly mounted over said pin 26 and the entire bed plate 27 together with the heel plate 24 may be adjustably moved and secured in the desired position relative to the foot plate 10 as may be desired through the loosening of the nut 28 which is threaded on the lower end of the pin 26, said pin 26 being mounted through the pedal 5 in the slot 29.

The usual brake rod connections 30 are secured to the base of the pedal 5 at 31 thereby operating the foot brakes be they two wheel or four wheel brakes in the usual well known manner.

The lever arm 18 through its outer end 32 will be connected in the usual well known manner through rods to the carburetor so as to control the same whereby the gas feed of the carburetor is turned off in the position of the foot plate 10 as shown in Figure 1 and will be thrown on as this foot plate 10 is swung to the other side of the pedal 5 and the foot brakes will be operated in the usual well known manner by the downward pressure of the pedal 5 customary to the usual practice, said pedal 5 being restored to its normal operative position, releasing the brakes under spring pressure automatically so restoring it in accordance with the usual practice.

The operation of my device is most simple. The operator's foot is normally resting on the plate 10 with the heel on the revoluble heel plate 24 and will be so maintained while the car is in use as this position for the foot is arranged in a comfortable manner so that it is normal and natural for the operator to keep his foot in this position. As the car is thrown into gear and started the accelerator will be gradually thrown on to attain the regular speeds through the operator swinging his right foot to the left whereby the plate 10 is gradually thereby swung from the position shown in Figure 1 toward the left gradually increasing the feeding of the gas to the carburetor and thereby accelerating the car in the usual well known manner. The gradual slowing of the car is also obtained by the operator merely swinging the foot to the right gradually carrying the plate 10 back to its position as shown in Figure 1 and the heel plate 24 always rotating freely with the turning of the foot of the operator in any direction. To stop the car the operator presses down on the right foot thereby depressing the pedal 5 so as to operate the foot brakes in the usual and well known manner. In case of an emergency when the car may be running at high speed the foot plate 10 will be way over to the left position and the operator, whether he turns his foot to the right or not, by merely pressing downward to jam the foot brakes in the usual manner will thereby of necessity roll the foot plate 10 to the extreme right position as shown in Figure 1 as the foot plate 10 is mounted on ball bearings 12 and also on a bed 6 which is substantially inclined downwardly to the right so that the accelerator is instantly and simultaneously shut off by the operator merely stiffening out and pressing down hard on the foot plate 10 because the foot plate 10 must of necessity run instantly to the position shown in Figure 1 whereby the accelerator is instantly shut off and the foot brakes applied simultaneously thereby effecting a quicker and surer stop of the car operated than can be effected by any other means for the reason that the accelerator and foot brakes are both controlled by the one operating right foot.

It is apparent that many variations may be made in the construction of my device without departing from the spirit and intent of the invention.

I claim:

1. In an automobile foot brake pedal the combination of foot braking means and accelerator control means both operated by mere downward pressure on the foot plate whereby the foot plate is rolled to the right cutting off the gas and effecting a complete braking.

2. In a foot brake for power vehicles a foot brake pedal and an arcuate movable foot plate accelerator control mounted on said pedal both operated by mere downward pressure on the foot plate whereby the foot plate is rolled to the right cutting off the gas and effecting a complete braking.

3. In a foot brake for power vehicles a foot brake pedal, an arcuate movable foot plate accelerator control mounted on said pedal operated by downward pressure on the foot plate whereby the foot plate is rolled to the right cutting off the gas and effecting a complete braking, and a separate revolvable heel plate also mounted on said pedal.

4. In a foot brake for power vehicles the combination of a foot brake pedal bevelled to the right facing the front of said vehicle, arcuate grooves in the top bed of said pedal, a foot plate bevelled so as to cooperate with said pedal having arcuate grooves thereunder in alignment with the bed pedal grooves, ball bearings mounted between the same, over plates extending so as to retain said foot plate and bearings in operating position, a revolvable heel plate mounted on said pedal and foot brake connecting rods and accelerator rods operatively connecting said pedal and accelerator plate to foot brakes and carburetor respectively.

5. In a foot brake for power vehicles the combination of a foot brake pedal bevelled to the right facing the front of said vehicle, arcuate grooves in the top bed of said pedal, a foot plate bevelled so as to cooperate with said pedal having arcuate grooves thereunder in alignment with the bed pedal grooves, ball bearings mounted between the same, over plates extending so as to retain said foot plate and bearings in operating position, a revolvable heel plate mounted in a manner longitudinally adjustable on said pedal and foot brake connecting rods and accelerator rods operatively connecting said pedal and accelerator plate to foot brakes and carburetor respectively.

6. In a foot brake for power vehicles the combination of a foot brake pedal operatively connected to foot brakes in the usual manner, a bevelled bed cut in said pedal, arcuate slots in said bed, a bevelled foot accelerator cooperating with said pedal bed and plate having arcuate slots in alignment with said bed slots connected in the usual manner to the carburetor, ball bearings mounted in said slots between said bed and plate, projecting edges on said plate and retaining projections on said pedal cooperating to hold said plate in operative position and means for automatcally restoring said plate to inoperative position.

7. In a foot brake for power vehicles the combination of a foot brake pedal operatively connected to foot brakes in the usual manner, a bevelled bed cut in said pedal, arcuate slots in said bed, a bevelled foot accelerator cooperating with said pedal bed and plate having arcuate slots in alignment with said bed slots connected in the usual manner to the carburetor, ball bearings mounted in said slots between said bed and plate, projecting edges on said plate and retaining projections on said pedal cooperating to hold said plate in operative position, means for automatically restoring said plate to inoperative position and a revolvable and longitudinally adjustable heel plate mounted on said pedal.

In testimony whereof I affix my signature.

VALENTINE G. BROCHON.